(12) United States Patent
Stephens et al.

(10) Patent No.: US 6,345,040 B1
(45) Date of Patent: Feb. 5, 2002

(54) SCALABLE SCHEDULED CELL SWITCH AND METHOD FOR SWITCHING

(75) Inventors: Donpaul C. Stephens, Pittsburgh, PA (US); Jon C. R. Bennett, Sudbury, MA (US)

(73) Assignee: Marconi Communications, Inc., Warrendale, PA (US)

( * ) Notice: Subject to any disclaimer, the term of this patent is extended or adjusted under 35 U.S.C. 154(b) by 0 days.

(21) Appl. No.: 09/126,475

(22) Filed: Jul. 30, 1998

(51) Int. Cl.[7] .............................................. G06R 31/08
(52) U.S. Cl. ...................................... 370/232; 370/413
(58) Field of Search ................................ 370/229, 230, 370/231, 232, 233, 234, 235, 236, 237, 238, 389, 381, 392, 394, 395, 396, 397, 412, 413, 414, 415, 416, 417, 418

(56) References Cited

U.S. PATENT DOCUMENTS

| | | | | |
|---|---|---|---|---|
| 5,592,476 A | * | 1/1997 | Calamvokis et al. | 370/392 |
| 5,689,508 A | * | 11/1997 | Lyles | 370/391 |
| 5,956,322 A | * | 9/1999 | Charny | 370/232 |
| 5,978,359 A | * | 11/1999 | Caldara et al. | 370/236 |
| 5,982,776 A | * | 11/1999 | Manning et al. | 370/414 |
| 6,081,507 A | * | 6/2000 | Chao et al. | 370/235 |

* cited by examiner

Primary Examiner—Chau Nguyen
Assistant Examiner—Inder Pal Mehra
(74) Attorney, Agent, or Firm—Ansel M. Schwartz

(57) ABSTRACT

A telecommunications switch. The switch includes a first output port mechanism through which sessions having cells are sent at a total session rate to a network. The switch includes a first input port mechanism through which sessions are received from the network. The first input port mechanism is connected to the first output port mechanism. The first input port mechanism has a first guaranteed session rate. The switch includes a second input port mechanism through which sessions are received from the network. The second input port mechanism is connected to the first output port mechanism. The second input port mechanism has a second guaranteed session rate, the sum of all guaranteed session rates are less than or equal to the total session rate. The switch includes a first scheduler connected to the first and second input port mechanisms and to the first output port mechanism for scheduling sessions of the input port mechanisms for service. The switch includes a server for providing service to sessions of the input port mechanisms. The server is connected to the first and second input port mechanisms and the first output port mechanism. A method for switching sessions having cells.

29 Claims, 2 Drawing Sheets

SCALABLE SCHEDULED CELL SWITCH AND METHOD FOR SWITCHING

FIELD OF THE INVENTION

The present invention is related to a scheduler. More specifically, the present invention is related to the design of a scheduler for a number of outputs in a distributed fashion.

BACKGROUND OF THE INVENTION

ATM is currently viewed as the technology behind future integrated services networks. Within these networks, it is desirable that individual flows (VCs) be able to receive a guaranteed service rate through the network. While mechanisms have been developed that enable this to be performed in an output buffered switch, these are known not to scale. For an integrated services network to be cost-effective, there is a need for these services to be provided at low cost in a large scale switch. The present invention provides an efficient approach for providing bandwidth guarantees in a scalable switch.

Currently, ATM switches are primarily constructed as output buffered or shared memory based systems due to the simplicity in making non-blocking devices. Larger scale (10 Gbps) ATM switches are presently constructed using a layered set output buffers, one that accepts traffic at the aggregate rate of the device, another that accepts a slower rate and attempts to divide the bandwidth among a set of ports managed by the controller for this secondary memory.

Since the bandwidth managed for these ports is a valuable resource subject to contention, schedulers are used to order when connections are serviced for a given port. These schedulers are generally placed on the aforementioned secondary memory. The schedulers on these secondary memories attempt to provide service guarantees for egress traffic on the ports managed by it. These service guarantees are based largely on the assumption that the main point of contention among egress flows is at the secondary memory. In actuality, only a fraction of the system bandwidth is supplied to the secondary buffering point. This and the fact that multiple ports are commonly associated with these units leads to them often being referenced as multiplexors/demuliplexors in the literature.

As systems are constructed of increasingly larger scale, the fraction of total system bandwidth that can be provided to a single multiplexor decreases asymptotically, thus reducing the correctness of their model. When feedback flow control, such as ABR, is performed in the multiplexors of such large scale devices with incorrect system wide information, it is easy to see that the system can place itself into perennial instability.

While operational stability is of concern for a user of equipment, the manufacturing cost of goods is of primary concern for the company developing the switch (lower cost implies higher profit margins for a given device cost). The physical area, power, cooling, and cost of output buffered switches is well known to be an $N^2$ problem, i.e., as the number of ports grow, the sum of the input bandwidth for N ports must be able to be buffered at each of N outputs. The cost/performance of memory technology exists as a step function. That is, for a desired amount of bandwidth, the cost remains relatively stable or increases with some rate during some periods with significant jumps in some locations. While increased width may be used to decrease the bandwidth required per-part, the systems are no longer able to pipeline accesses internally. In the limit, a single cell can be stored on one address in memory (53 Byte+overhead wide memory). At very high speeds, only SRAM can sustain the speed of accesses required. SRAM devices require more transistors to implement a memory of a given size that DRAM, this increases the cost of goods for these devices. The board area, power, and cooling for these SRAM devices (which grow with $N^2$) is known to limit the scalability of output buffered switches.

In systems where connectivity alone is desired, many academic solutions have centered around constructs originally designed to perform circuit switching such as banyan, batcher banyan, and even feedback based networks including the aforementioned as components. These switches are often simulated under highly optimistic assumptions of uniform traffic distributions and lightly loaded networks. Real data networks contain servers for file systems, web pages, and additional services; these functions provide a valuable resource onto themselves and are cause for the output distribution to be asymmetric. The global Internet utilizes a core set of protocols, with TCP/IP being the foremost often used pair. The TCP stacks on end systems attempt to keep traffic in the network so that whenever bandwidth becomes available, it may be used by the applications.

Being based on circuit switching constructs, their key metric is blocking probability (an output link remaining idle when cells are enqueued in the system for it). However, even under the optimistic assumptions used by their designers, analysis often shows perceptible blocking probability (which is zero for output buffered switches). These switches are also centralized in nature, i.e., the entire switch core is located on a chip, or set of chips that are co-located on a board. This impacts the ability to construct fault tolerant devices. Network devices, including switches and routers, within such networks are thus often placed under high loads. Some of these switches would restrict or drop traffic for uncongested ports if other ports became congested for a small period of time (10s of cells). It is for these reasons that such switches have not found commercial success.

These circuit switch based devices generally had buffers placed at their inputs. Extensive analysis has been done on the tradeoffs of input versus output queued switches. In a non-blocking input buffered switch with FIFO queuing, when the cell at the head of the queue is blocked due to contention for a given output port, all cells behind it within the queue are prevented from being transmitted, even when their output port is idle. This situation is called head-of-line (HOL) blocking. This is a well known problem, that in the presence of uniformly distributed traffic across all ports results in limiting switch throughput to 58% of the bandwidth of the connecting links [M. Karol, M. Hluchyj, and S. Morgan. "Input Versus Output Queuing on a Space-Division Packet Switch." IEEE Transactions on Communications, 35(12):1347–1356, December 1987.] In fact, throughput can fall as low as that of a single link [S. Li, "Theory of Periodic Contention and its Application to Packet Switching." In Proceedings of IEEE INFOCOM '88, 320–325, March 1988.].

While having poor throughput performance, avoiding buffering at the aggregate switch rate has encouraged further study in this field. [T. Anderson, S. Owicki, J. Saxe, and C. Thacker. "High Speed Switch Scheduling for Local Area Networks."] separates data forwarding from system scheduling, and utilizes per connection queues at the inputs, while using a crossbar with a centralized switch scheduler. Fixed size frames are used to support guaranteed traffic. While this solves the blocking problem of earlier input queued switches, many limitations are present. Its guarantees are rather course grain. A crossbar is actually not an expensive mechanism in high speed switches, as the number of internal ports is low. The key problem is the centralized scheduler. While satisfactory for a local area switch of its time, this leads to an unacceptable failure point for a large scale enterprise or WAN switch required in the next few years.

Noting that the performance of large scale systems is limited by the bandwidth on the internal links, [F. M. Chiussi, Y. Xia, and V. P. Kumar. "Backpressure in Shared-Memory-Based ATM Switches under Multiplexed Bursty Sources", In Proceedings of IEEE INFOCOM '96] explored a switch using buffers at the inputs, along the outputs, and within the switch core. While this was shown to yield dramatic improvements in buffering requirements, no methods were proposed for providing bandwidth guarantees.

What is needed is a mechanism for providing a wide array of fine grain connection guarantees in a large scale networking device at a moderate cost. It is among the objects of the invention to overcome the aforementioned limitations of the prior art by providing a method and apparatus for constructing a distributed scheduler for a cell switched network.

SUMMARY OF THE INVENTION

The present invention pertains to a telecommunications switch. The switch comprises a first output port mechanism through which sessions having cells are sent at a total session rate to a network. The switch comprises a first input port mechanism through which sessions are received from the network. The first input port mechanism is connected to the first output port mechanism. The first input port mechanism has a first guaranteed session rate. The switch comprises a second input port mechanism through which sessions are received from the network. The second input port mechanism is connected to the first output port mechanism. The second input port mechanism has a second guaranteed session rate, the sum of all guaranteed session rates are less than or equal to the total session rate. The switch comprises a first scheduler connected to the first and second input port mechanisms and to the first output port mechanism for scheduling sessions of the input port mechanisms for service. The switch comprises a server for providing service to sessions of the input port mechanisms. The server is connected to the first and second input port mechanisms and the first output port mechanism.

The present invention pertains to a method for switching sessions having cells. The method comprises the steps of receiving a first session having cells at a first input port mechanism of a switch. Then there is the step of storing the first session in a first input queue of the first input port mechanism. Next there is the step of receiving a second session at a second input port mechanism of the switch. Then there is the step of storing the second session in a second input queue of the second input port mechanism. Next there is the step of providing service from a server to the first session at a first guaranteed session rate. Then there is the step of transferring cells of the first session to a first output queue of a first output queue mechanism. Next there is the step of sending the cells of the first session out of the switch to a network with a first output card connected to the first output queue and the network. Then there is the step of providing service from the server to the second session at a second guaranteed session rate. Next there is the step of transferring cells of the second session to the first output queue. Then there is the step of sending the cells of the second session of the switch to the network.

The present invention pertains to a method for building a scheduler for a large scale switch. In particular, this invention describes how to provide bandwidth and delay bounds in a buffered crossbar switch. In such a switch, buffers are maintained internal to the switch for each pair of input-output nodes. When a cell is sent from the switch core to an output, a credit is returned to the input that had sent the cell into the switch core. An input may send a cell to any output for which it has a credit. While prior art mechanisms have employed these techniques to reduce the complexity of switch design, they were unable to provide bandwidth or delay guarantees. This invention utilizes a scheduled hierarchy within the crossbar switch and at the input nodes to select the order in which cells may pass through the switch core. Separate matrix buffer pairs are maintained at each node for all source nodes within its section for destinations at itself and images in adjoining sections. These buffers enable scheduling decisions to be made with minimal local information, are small enough to fit onchip, and utilize a credit mechanism to denote when buffers are available. Credits are eventually returned to the source section of the nodes (which provide data into the matrix). The source section contains a per connection input queue which buffers all traffic arriving on its input port(s). Cells are scheduled for destination nodes (the output port interface section) within the switch that have buffer credits based on the relative needs of these destination nodes. This enables a very large switch to be constructed that provides per-flow guarantees in a distributed manner. Prior art schedulers are assumed to be output buffered, prior art large scale switches only provide connectivity.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1A:
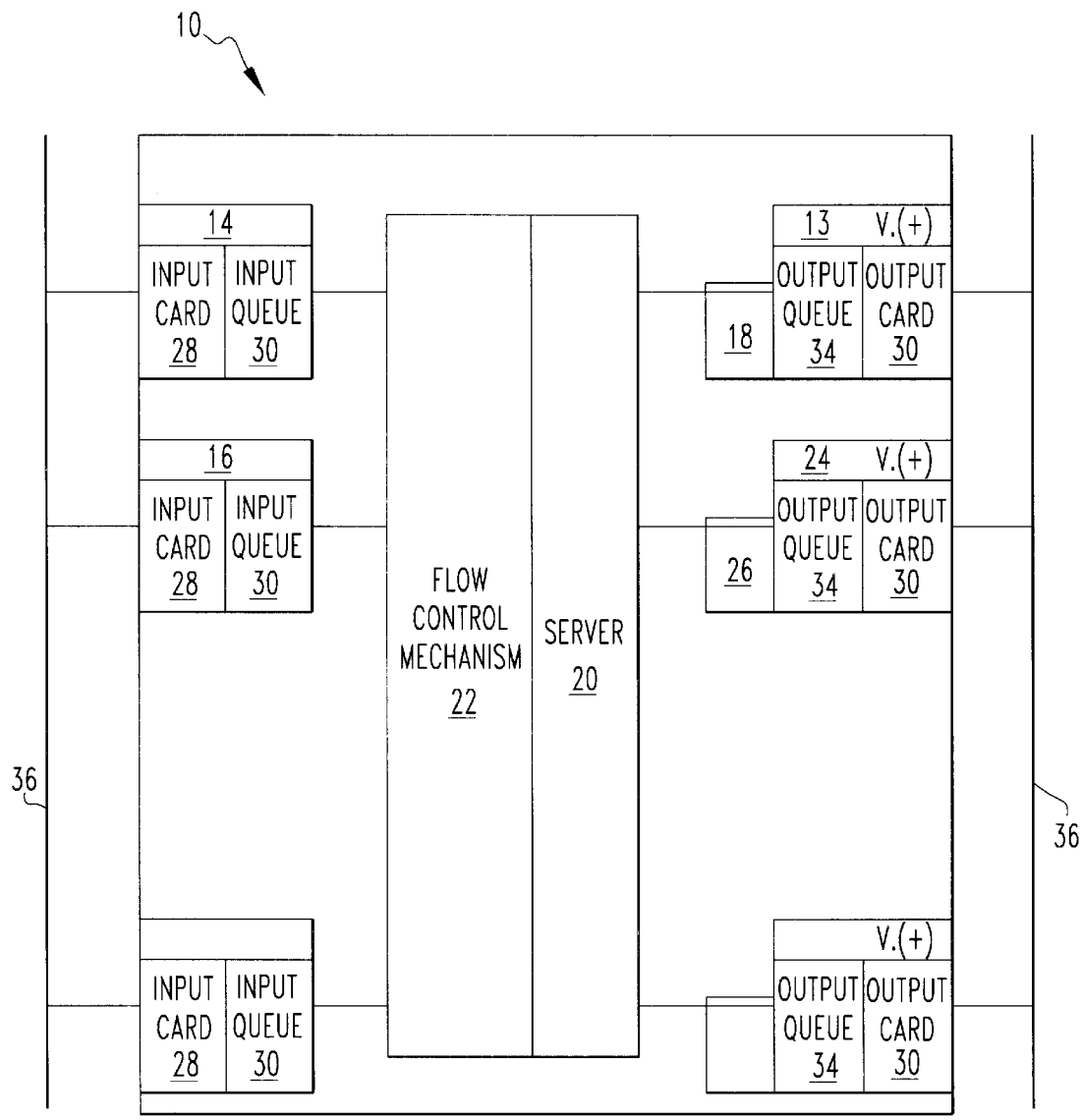
FIG. 1a is a schematic representation of a switch of the present invention.
Figure 1B:
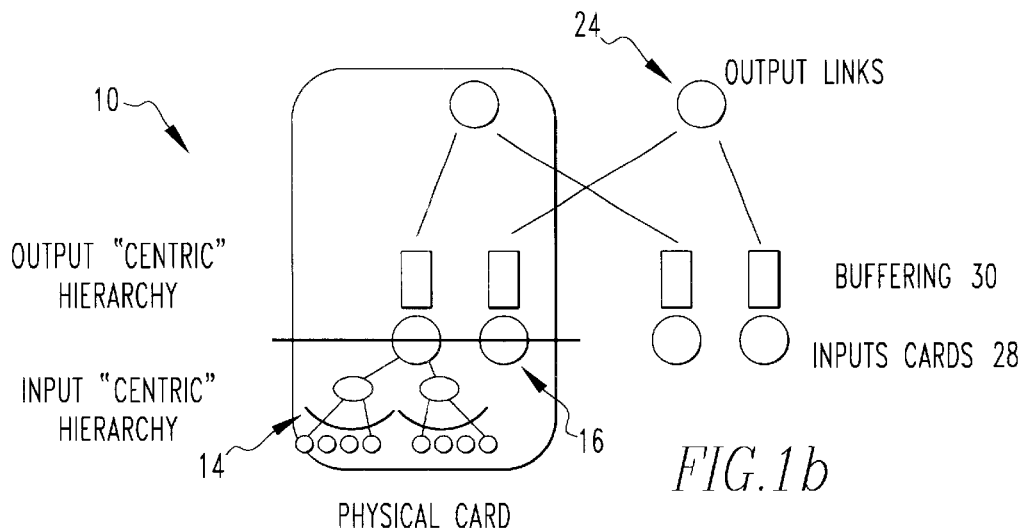
FIG. 1b is a schematic representation of a switch of the present invention.

Referring now to the drawings wherein like reference numerals refer to similar or identical parts throughout the several views, and more specifically to FIGS. 1a and 1b thereof, there is shown a telecommunications switch 10. The switch 10 comprises a first output port mechanism 12 through which sessions having cells are sent at a total session rate to a network 36. The switch 10 comprises a first input port mechanism 14 through which sessions are received from the network 36. The first input port mechanism 14 is connected to the first output port mechanism 12. The first input port mechanism 14 has a first guaranteed session rate. The switch 10 comprises a second input port mechanism 16 through which sessions are received from the network 36. The second input port mechanism 16 is connected to the first output port mechanism 12. The second input port mechanism 16 has a second guaranteed session rate, the sum of all guaranteed session rates are less than or equal to the total session rate. The switch 10 comprises a first scheduler 18 connected to the first and second input port mechanisms and to the first output port mechanism 12 for scheduling sessions of the input port mechanisms for service. The switch 10 comprises a server 20 for providing service to sessions of the input port mechanisms. The server 20 is connected to the first and second input port mechanisms and the first output port mechanism 12.

Preferably, the switch 10 includes a flow control mechanism 22 for ensuring cells are not lost after they are received at an input port mechanism and until they are sent out an output port mechanism. The flow control mechanism 22 is connected to the input port mechanisms and the output port mechanism. The switch 10 preferably includes a second output port mechanism 24 connected to the server 20 and the first and second input port mechanisms. Preferably, the switch 10 includes a second scheduler 26 connected to the first and second input port mechanisms and the second output port mechanism 24 for scheduling sessions of the input port mechanisms for service from the server 20.

Each output port mechanism preferably has a virtual time associated with it. Preferably, the server 20 maintains the virtual time for each output port mechanism. Each input port mechanism preferably assigns a start time and a service interval to each cell that arrives at the respective input port mechanism. Preferably, the start time is the virtual time when a cell first requests service from the server 20 from the respective input port mechanism and the service interval is the number of the cells that may be read by the server 20 for every cell the server 20 reads from the respective input port mechanism. Each input port mechanism preferably has a finishing time equal to the start time plus the service interval. Preferably, the server 20 provides service to the input port mechanism having the smallest eligible finishing time.

Each input port mechanism preferably comprises an input card 28 which receives cells and an input queue 30 in which cells that are received by the input card 28 are stored, said input queue 30 connected to the input card 28 and the server 20. Preferably, each output port mechanism includes an output card 32 which sends cells to the network 36 and an output queue 34 in which cells are stored for the output card 32, said output queue 34 connected to the output card 32 and to the server 20.

The server 20 preferably reads a cell from the input queue 30 of the first input port mechanism 14 for an output queue 34 of the first output port mechanism 12, and the server 20 causes the finish time of the first input port mechanism 14 to become the start time of the input queue 30 of the first input port mechanism 14. Preferably, the server 20 compares the start time of a cell that arrives at an empty input queue 30 with the virtual time of the queue the cell is to be transferred to and sets the start time to the virtual time if the start time is less than a virtual time, or sets the start time of the input port mechanism to the virtual time of an output port mechanism which sends a credit to the input port mechanism. The server 20 preferably only resets the start time of an input queue 30 when a cell is stored in an input queue 30 or read out of an input queue 30, or a credit from an output port mechanism is received by an input queue 30. Preferably, the input card 28 may elect to send a cell to any output port mechanism to which the input card 28 has a credit.

The present invention pertains to a method for switching sessions having cells. The method comprises the steps of receiving a first session having cells at a first input port mechanism 14 of a switch 10. Then there is the step of storing the first session in a first input queue 30 of the first input port mechanism 14. Next there is the step of receiving a second session at a second input port mechanism 16 of the switch 10. Then there is the step of storing the second session in a second input queue 30 of the second input port mechanism 16. Next there is the step of providing service from a server 20 to the first session at a first guaranteed session rate. Then there is the step of transferring cells of the first session to a first output queue 34 of a first output queue 34 mechanism. Next there is the step of sending the cells of the first session out of the switch 10 to a network 36 with a first output card 32 connected to the first output queue 34 and the network 36. Then there is the step of providing service from the server 20 to the second session at a second guaranteed session rate. Next there is the step of transferring cells of the second session to the first output queue 34. Then there is the step of sending the cells of the second session of the switch 10 to the network 36.

Preferably, the transferring cells of the first session includes the steps of producing a credit by the output port mechanism which was transferred a cell from the first session; and returning the credit to the first input port mechanism 14 which transferred the cell to the first output port mechanism 12.

The receiving the first session step preferably includes the step of assigning a start time to the first input port mechanism 14 equal to the virtual time when the first session first requests service from the server 20, and a service interval to the first input port mechanism 14, where the service interval is the number of cells that may be read by the server 20 for every cell the server 20 reads from the first input port mechanism 14. Preferably, after the assigning step there is the step of determining a finishing time of the first input port mechanism 14 equal to the starting time and the service interval. The receiving the second session step preferably includes the step of determining the finishing time of the second input port mechanism 16.

Preferably, after the determining the finishing time of the second input port mechanism 16 there is the step of providing service by the server 20 to the input port mechanism having the smallest eligible finishing time for the first output port mechanism 12 based on a first scheduler 18 associated with the first output port mechanism 12. After the providing service step there is preferably the step of providing service by the server 20 to the input port mechanism having the smallest eligible finishing time for the second output port mechanism 24 based on a second scheduler 26 associated with the second output port mechanism. The second scheduler 26 is independent and separate from the first scheduler 18.

Preferably, after the transferring the first cell step there is the step of changing the start time of the first input port mechanism 14 to be the finish time of the first input port mechanism 14 if additional cells remain in the first input port mechanism 14. The receiving the first session step preferably includes the step of receiving a second cell at the first input port mechanism 14 while the first cell is in the first input port mechanism 14 without changing the virtual time.

Preferably, the serving the first session step includes the steps of receiving the first cell of the first session at the first input port mechanism 14, comparing the start time of the first input port mechanism 14 with virtual time of the output port mechanism which the first cell is to be sent out of, and setting the start time to the virtual time if the start time is less than virtual time. After the returning the credit step, there is preferably the step of updating the start time to virtual time if the first input port mechanism 14 has no credits. Preferably, after the receiving the first cell at the first input port mechanism 14, there is the step of choosing an output port mechanism to transfer the first cell to from all the output port mechanisms which have provided credits to the first input port mechanism 14.

Figure 2:
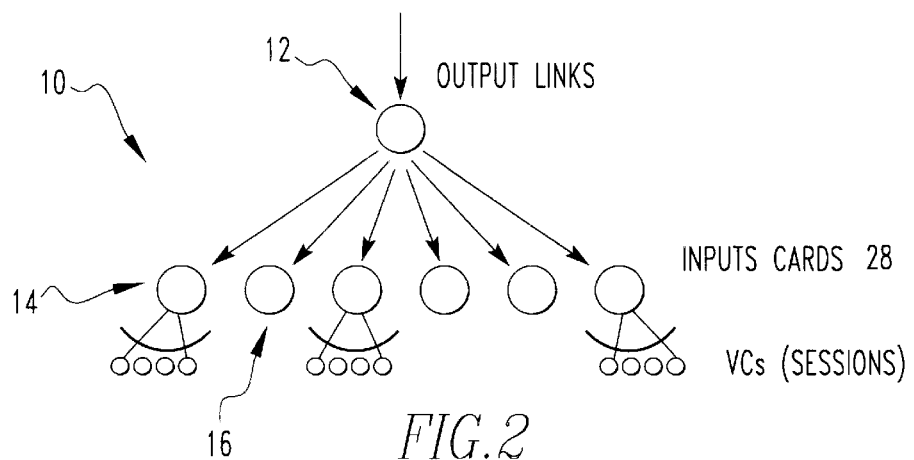
FIG. 2 is a schematic representation of a hierarchical distribution regarding the switch.

In the operation of the preferred embodiment, a switch 10 core of an ATM switch in an ATM network 36 such as that described in [F. M. Chiussi, Y. Xia, and V. P. Kumar. "Backpressure in Shared-Memory-Based ATM Switches under Multiplexed Bursty Sources", In Proceedings of IEEE INFOCOM '96], incorporated by reference herein, may be extended to provide bandwidth guarantees to sessions, such as VCs, passing through it by the application of two overlaid hierarchical fair queuing servers 20. As was shown in [T. Anderson, S. Owicki, J. Saxe, and C. Thacker. "High Speed Switch Scheduling for Local Area Networks."], incorporated by reference herein, the delay bounds of a session in a hierarchical fair queuing server 20 depends on W. I. of the schedulers forming the scheduling tree. While this is described in the context of hierarchical resource allocation at an output node, these principles can be utilized to enable bandwidth guarantees to be made in an input buffered switch 10 as described herein. See FIG. 2 which shows a hierarchical distribution from an output port mechanism to input port mechanisms which are having sessions passing through them.

From the output card 32 of an output port mechanism, a hierarchy is constructed comprised of all of the input cards 28 of the input port mechanisms, with their sessions beneath them. The input cards 28 need to be allocated a rate that is at least the sum of the rates of the sessions passing from that input card 28 to the chosen output card 32. So long as the input card 28 is served by the output card 32 at least as fast as its sum of guaranteed session rates, the rates of the sessions may be met. However, the contention at the input card 28 among output cards 32 can be broken based on the demands of the users, with essentially any contention breaking scheme acceptable. Since an input card 28 may have cells simultaneously offered for multiple output cards 32, multiplexing can occur when an input card 28 schedules a cell for each output. Then, the multicast cell is provided, in turn, to each output card 32 to which it is to be transferred. Output buffering and a small level of speedup is required to insure high throughput under diverse traffic conditions.

Figure 3:
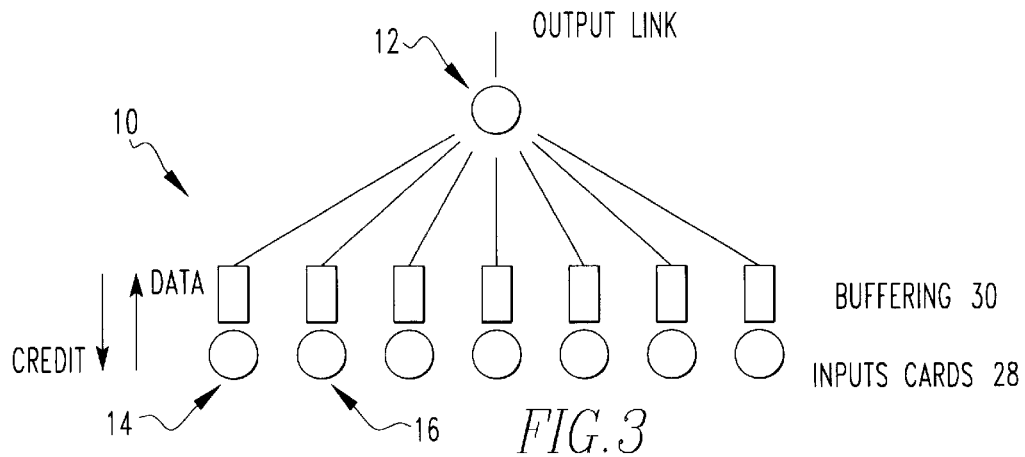
FIG. 3 is a schematic representation of credit-flow in the switch.

Mechanisms such as those described in [F. M. Chiussi, Y. Xia, and V. P. Kumar. "Backpressure in Shared-Memory-Based ATM Switches under Multiplexed Bursty Sources", In Proceedings of IEEE INFOCOM '96], incorporated by a reference herein, and others have used a simple credit-flow control mechanism 22 internal to a switch core to insure the internal system may be lossless. A credit is returned to an input card 28 when data may be sent forward in the switch 10 for service by the server 20 and ultimate transfer to a desired output card 32. A similar credit mechanism internal to the core is used herein for such purposes. See FIG. 3 which shows how the data is transferred ultimately to an output card 32 and the cell sending input queue 30 receives a credit.

With such a credit-flow control mechanism 22 in place, a crossbar internal to the switch 10 implements the separate scheduler for each output card 32. In turn, each input card 28 is assigned to items, a start time, and a service interval. A third item, the finish time of the input queue 30 may be calculated by adding the start time and the service interval. Additionally, the server 20 maintains a separate output virtual time, V (t), for each output card 32. The service interval is the number of cells that may be read by the server 20 for every cell of the session it reads from the given input queue 30. Among all of the input queues 30, the server 20 provides service to the cell having the smallest eligible finish time first. The start time, service interval and finish time can be stored in any memory associated with the input queue 30 or at the input port mechanism or at the server 20. A pointer mechanism can be used to link the finish time to the cell to possibly minimize storage usage.

When the a cell is read from one of the input queues 30 for an output queue 34 of an output port mechanism, the finish time of the input queue 30 is written to the start time location so the start time is reset to the finish line of the cell receiving service from the server 20. If additional cells remain in the input queue 30 from which the cell receiving service by the server 20 is read, the finish time which has been reset to the start time, is the start time for the cell to receive service next in the input queue 30. Otherwise, if there are no additional cells remaining in the input queue 30, the queue is marked as empty and is thus not considered by any of the schedulers of the output port mechanisms. Thus, the start times of the input queues 30 are updated or reset only when a cell is physically stored in the respective input queue 30, or the input queue 30 receives a credit from an output port mechanism which just receives a cell from the input queue 30.

At the input cards 28, the input card 28 selects among all the outputs for which it has credits using the SEFF policy. The start time of an input card 28 may be reset whenever an input card 28 that previously had no cells enqueued in its input queue 30 are to receive an arrival of a cell, or a credit arrives from an output port mechanism where there were no outstanding credits.

The flow control mechanism is aware, as is well known in the art, of the service the server and the output port mechanisms can provide. When an input card 28 is added, the flow control mechanism reduces the service to the already present input cards 28 so service is available for the new input card 28. In this way, cards can be added (or removed—service is then increased to the remaining input cards 28).

Because this hierarchy uses a simple credit-flow mechanism, the switch 10 may be designed in a pipelined fashion. This may be performed by having multiple successive chips that implement the credit-flow response mechanism where each mode contains a scheduler for each output port mechanism. Scalability is enabled by latency tolerance. The cross bar units for each output port mechanism need not be co-located on a single device, and well known techniques for deciding fault tolerant cross point systems may be used if those aspects are desired. By having a distributed scheduler system, with each output port mechanism having its own scheduler, it is a matter of only adding an output port mechanism with a scheduler to the switch 10 to expand it, or to contract it. Since each output port mechanism stands independent and capable of immediate operation, it only requires recognition by the server 20 that there is another output port mechanism which is to receive service. The server 20 can provide service to each of the output port mechanisms in a round robin fashion or any other queuing fashion so that each output port mechanism, which has already determined the cell that is to receive service next, can readily provide the next cell for service when that output port mechanisms turn arrives.

For a more complete discussion of ATM, see, for instance, "Gigabit Networking" by Craig Partridge, Addison Wesley, 1994; "ATM User Network Interface Specification, Version 3.0" by the ATM Forum, Prentice Hall, 1994; "Asynchronous Transfer Mode Networks: Performance Issues", by Raif O. Onvural, Artech House, Inc., Norwood, Mass. 1994, and "Comparison of Rate-Based Service Disciplines" by Hui Zhang and Srinivasov Keshav, Proceedings of ACM SIGCOMM '91, all of which are incorporated by reference.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A telecommunications switch comprising:
    a first output port mechanism through which sessions having cells are sent at a total session rate to a network;
    a first input port mechanism through which sessions are received from the network, said first input port mechanism connected to the first output port mechanism, said first input port mechanism having a first guaranteed session rate;
    a second input port mechanism through which sessions are received from the network, said second input port mechanism connected to the first output port mechanism, said second input port mechanism having a second guaranteed session rate, the sum of all guaranteed session rates less than or equal to the total session rate;
    a first scheduler connected to the first and second input port mechanisms and to the first output port mechanism for scheduling sessions of the input port mechanisms for service;
    a server for providing service to sessions of the input port mechanisms, said server connected to the first and second input port mechanisms and the first output port mechanism; and
    a flow control mechanism for ensuring cells are not lost after they are received at an input port mechanism and until they are sent out an output port mechanism, said flow control mechanism connected to the input port mechanisms and the output port mechanism, said flow control mechanism adaptable to changes in input port mechanisms and output port mechanisms.

2. A switch as described in claim 1 including a second output port mechanism connected to the server and the first and second input port mechanisms.

3. A switch as described in claim 2 including a second scheduler connected to the first and second input port mechanisms and the second output port mechanism for scheduling sessions of the input port mechanisms for service from the server.

4. A switch as described in claim 3 wherein each output port mechanism has a virtual time associated with it.

5. A switch as described in claim 4 wherein the server maintains the virtual time for each output port mechanism.

6. A switch as described in claim 5 wherein each input port mechanism assigns a start time and a service interval to each cell that arrives at the respective input port mechanism.

7. A switch as described in claim 6 wherein the start time is the virtual time when a cell first requests service from the server from the respective input port mechanism and the service interval is the number of the cells that may be read by the server for every cell the server reads from the respective input port mechanism.

8. A switch as described in claim 7 wherein each input port mechanism has a finishing time equal to the start time plus the service interval.

9. A switch as described in claim 8 wherein the server provides service to the input port mechanism having the smallest eligible finishing time.

10. A switch has described in claim 9 wherein each input port mechanism comprises an input card which receives cells and an input queue in which cells that are received by the input card are stored, said input queue connected to the input card and the server.

11. A switch as described in claim 10 wherein each output port mechanism includes an output card which sends cells to the network and an output queue in which cells are stored for the output card, said output queue connected to the output card and to the server.

12. A switch as described in claim 11 wherein the server reads a cell from the input queue of the first input port mechanism for an output queue of the first output port mechanism, and the server causes the finish time of the first input port mechanism to become the start time of the input queue of the first input port mechanism.

13. A switch has described in claim 12 wherein the server compares the start time of a cell that arrives at an empty input queue with the virtual time of the queue the cell is to be transferred to and sets the start time to the virtual time if the start time is less than a virtual time, or sets the start time of the input port mechanism to the virtual time of an output port mechanism which sends a credit to the input port mechanism.

14. A switch as described in claim 13 wherein the server only resets the start time of an input queue when a cell is stored in an input queue or read out of an input queue, or a credit from an output port mechanism is received by an input queue.

15. A switch as described in claim 14 wherein the input card may elect to send a cell to any output port mechanism to which the input card has a credit.

16. A method for switching sessions having cells comprising the steps of:
    receiving a first session having cells at a first input port mechanism of a switch;
    storing the first session in a first input queue of the first input port mechanism;
    receiving a second session at a second input port mechanism of the switch;
    storing the second session in a second input queue of the second input port mechanism;
    providing service from a server to the first session at a first guaranteed session rate;
    transferring cells of the first session to a first output queue of a first output queue mechanism;
    sending the cells of the first session out of the switch to a network with a first output card connected to the first output queue and the network;
    providing service from the server to the second session at a second guaranteed session rate;
    transferring cells of the second session to the first output queue;
    sending the cells of the second session of the switch to the network.

17. A method as described in claim 16 wherein the transferring cells of the first session includes the steps of producing a credit by the output port mechanism which was transferred a cell from the first session; and returning the credit to the first input port mechanism which transferred the cell to the first output port mechanism.

18. A method as described in claim 17 wherein the receiving the first session step includes the step of assigning a start time to the first input port mechanism equal to the virtual time when the first session first requests service from the server, and a service interval to the first input port mechanism, where the service interval is the number of cells that may be read by the server for every cell the server reads from the first input port mechanism.

19. A method as described in claim 18 including after the assigning step there is the step of determining a finishing time of the first input port mechanism equal to the starting time and the service interval.

20. A method as described in claim 19 wherein the receiving the second session step includes the step of determining the finishing time of the second input port mechanism.

21. A method as described in claim 20 wherein after the determining the finishing time of the second input port mechanism there is the step of providing service by the server to the input port mechanism having the smallest eligible finishing time for the first output port mechanism based on a first scheduler associated with the first output port mechanism.

22. A method as described in claim 21 including after the providing service step there is the step of providing service by the server to the input port mechanism having the smallest eligible finishing time for the second output port mechanism based on a second scheduler associated with the second output port mechanism, said second scheduler independent and separate from said first scheduler.

23. A method as described in claim 22 including after the transferring the first cell step there is the step of changing the start time of the first input port mechanism to be the finish time of the first input port mechanism if additional cells remain in the first input port mechanism.

24. A method as described in claim 23 wherein the receiving the first session step includes the step of receiving a second cell at the first input port mechanism while the first cell is in the first input port mechanism without changing the virtual time.

25. A method as described in claim 24 wherein the serving the first session step includes the steps of receiving the first cell of the first session at the first input port mechanism, comparing the start time of the first input port mechanism with virtual time of the output port mechanism which the first cell is to be sent out of, and setting the start time to the virtual time if the start time is less than virtual time.

26. A method as described in claim 25 including after the returning the credit step, there is the step of updating the start time to virtual time if the first input port mechanism has no credits.

27. A method as described in claim 26 wherein after the receiving the first cell at the first input port mechanism, there is the step of choosing an output port mechanism to transfer the first cell to from all the output port mechanisms which have provided credits to the first input port mechanism.

28. A method as described in claim 16 wherein the first input port mechanism is a first ATM input port mechanism, the second input port mechanism is a second ATM input port mechanism, the server is an ATM server, and the network is an ATM network.

29. A switch as described in claim 1 wherein the first input port mechanism is a first ATM input port mechanism, the second input port mechanism is a second ATM input port mechanism, the server is an ATM server, and the network is an ATM network.

* * * * *